(12) United States Patent
Mazzarelli et al.

(10) Patent No.: US 11,932,162 B2
(45) Date of Patent: Mar. 19, 2024

(54) RATCHET WITH FORCE INDICATOR (71) Applicant: Commercial Sewing, Inc., Torrington, CT (US)

(72) Inventors: David Mazzarelli, Torrington, CT (US); Michael Hissong, Torrington, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 51 days.

(21) Appl. No.: 17/545,606

(22) Filed: Dec. 8, 2021

(65) Prior Publication Data

US 2022/0176865 A1 Jun. 9, 2022

Related U.S. Application Data (60) Provisional application No. 63/122,725, filed on Dec. 8, 2020.

(51) Int. Cl.
*B60P 7/08* (2006.01)
(52) U.S. Cl.
CPC .................. *B60P 7/083* (2013.01)
(58) Field of Classification Search
CPC .... B60P 7/083; B60P 7/0861; Y10T 24/2175; Y10T 24/2191; Y10T 24/21
See application file for complete search history.

(56) References Cited

U.S. PATENT DOCUMENTS

| | | | | |
|---|---|---|---|---|
| 4,542,883 A * | 9/1985 | Rutzki | .................... | B60P 7/083 254/223 |
| 6,654,987 B1 | 12/2003 | Wu | | |
| 8,432,290 B2 * | 4/2013 | Ruan | ...................... | G01L 5/103 340/665 |
| 8,601,645 B2 * | 12/2013 | Huang | ................... | B60P 7/083 254/218 |
| 8,847,758 B2 * | 9/2014 | Eide | ....................... | G01L 5/102 340/568.1 |
| 10,836,299 B2 * | 11/2020 | Hatcher | .................. | B60P 7/083 |
| 2016/0061676 A1 * | 3/2016 | Brown | .................. | G01L 5/0033 73/862.68 |

* cited by examiner

*Primary Examiner* — Robert Sandy
*Assistant Examiner* — Louis A Mercado
(74) *Attorney, Agent, or Firm* — CANTOR COLBURN LLP (57) ABSTRACT

A ratchet strap tensioning mechanism includes a barrel defining an axis of rotation and a body and a handle coupled via the barrel. Each of the body, handle and barrel is independently rotatable about the axis of rotation. At least one ratchet gear wheel is mounted to the barrel at a position between a portion of the body and the handle. A driver rotatably drives the at least one ratchet gear wheel about the axis of rotation and a pawl restricts rotation of the at last one ratchet gear wheel about the axis of rotation. A force indicating device is connected to at least one of the body and the handle. The force indicating device is operable to indicate to a user when a predetermined force is applied to the ratchet strap tensioning mechanism.

15 Claims, 8 Drawing Sheets

FIG. 1

FIG. 8

RATCHET WITH FORCE INDICATOR

CROSS-REFERENCE TO RELATED APPLICATIONS

This application claims the benefit of 63/122,725 filed Dec. 8, 2020, the disclosure of which is incorporated herein by reference in its entirety.

BACKGROUND

Embodiments disclosed herein pertain to a ratchet strap tightening mechanism, and more particularly, to a ratchet strap tightening mechanism for use with a vehicle cover.

Various techniques are known for securing objects on a transport vehicle or a tarp or cover on an object such as a boat, for example, during transport of the object. One of the most common methods for securing an object includes tying ropes to attachment points on the transport vehicle and attaching the ropes to the object or tightening the ropes against the object. Bungee cords or the like may be attached to the ropes and to attachment points on the transport vehicle to additionally secure the object on the vehicle. In some applications, tie-down straps fitted with ratchet mechanisms adapted to tighten the straps may be used to secure the object to the vehicle.

BRIEF DESCRIPTION

Disclosed is a ratchet strap tensioning mechanism includes a barrel defining an axis of rotation and a body and a handle coupled via the barrel. Each of the body, handle and barrel is independently rotatable about the axis of rotation. At least one ratchet gear wheel is mounted to the barrel at a position between a portion of the body and the handle. A driver rotatably drives the at least one ratchet gear wheel about the axis of rotation and a pawl restricts rotation of the at last one ratchet gear wheel about the axis of rotation. A force indicating device is connected to at least one of the body and the handle. The force indicating device is operable to indicate to a user when a predetermined force is applied to the ratchet strap tensioning mechanism.

Also disclosed is a method of operating a ratchet strap tensioning mechanism includes rotating a handle about an axis of rotation, driving a barrel and one or more ratchet gear wheels affixed to the barrel about an axis of rotation in response to rotating the handle, rotating a force indicating device relative to the handle, and indicating to the user when a predetermined force is applied to the ratchet strap tensioning mechanism.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
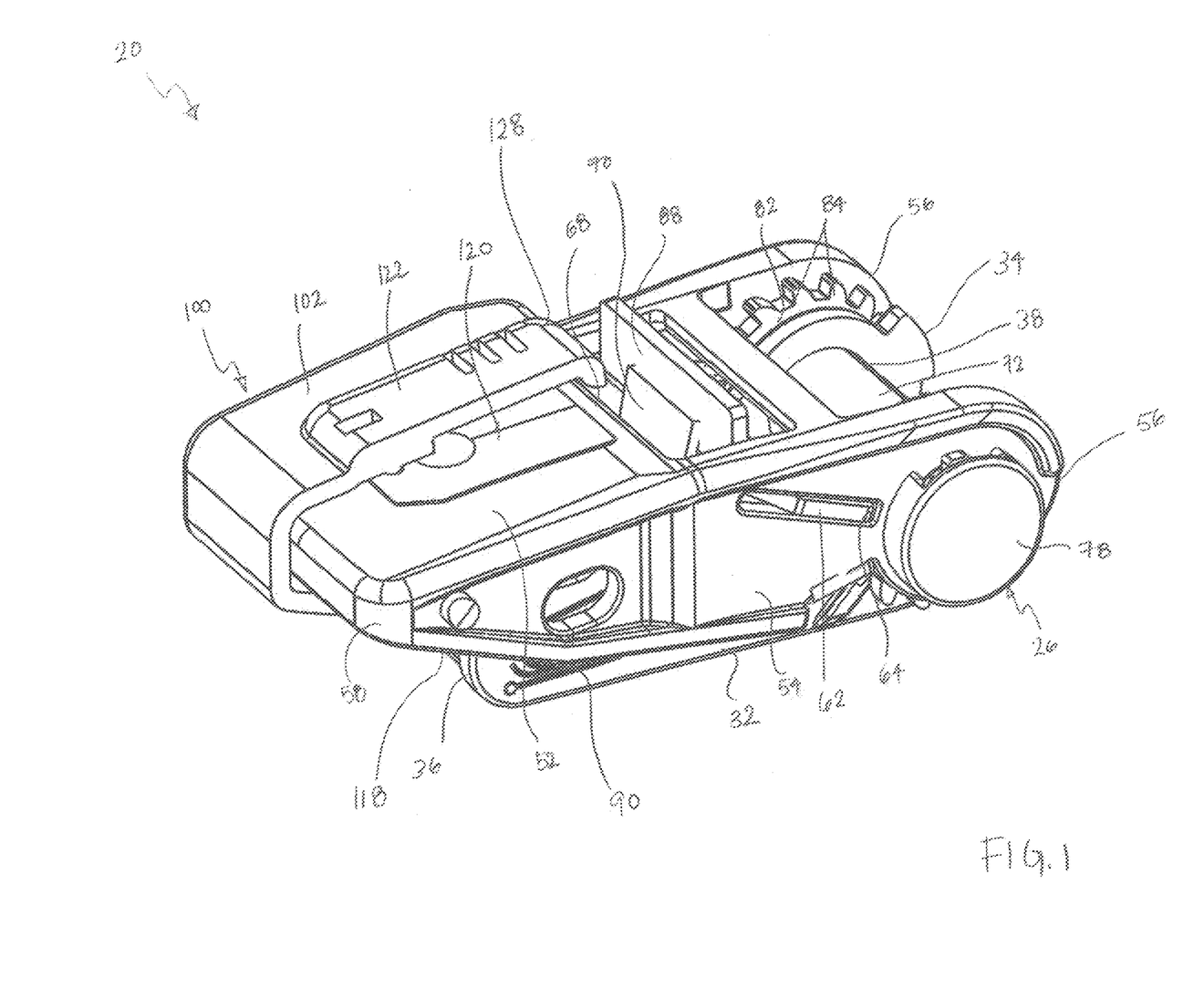
FIG. 1 is a perspective view of ratchet strap tensioning mechanism having a partially cut away force indicating device according to an embodiment.
Figure 2:
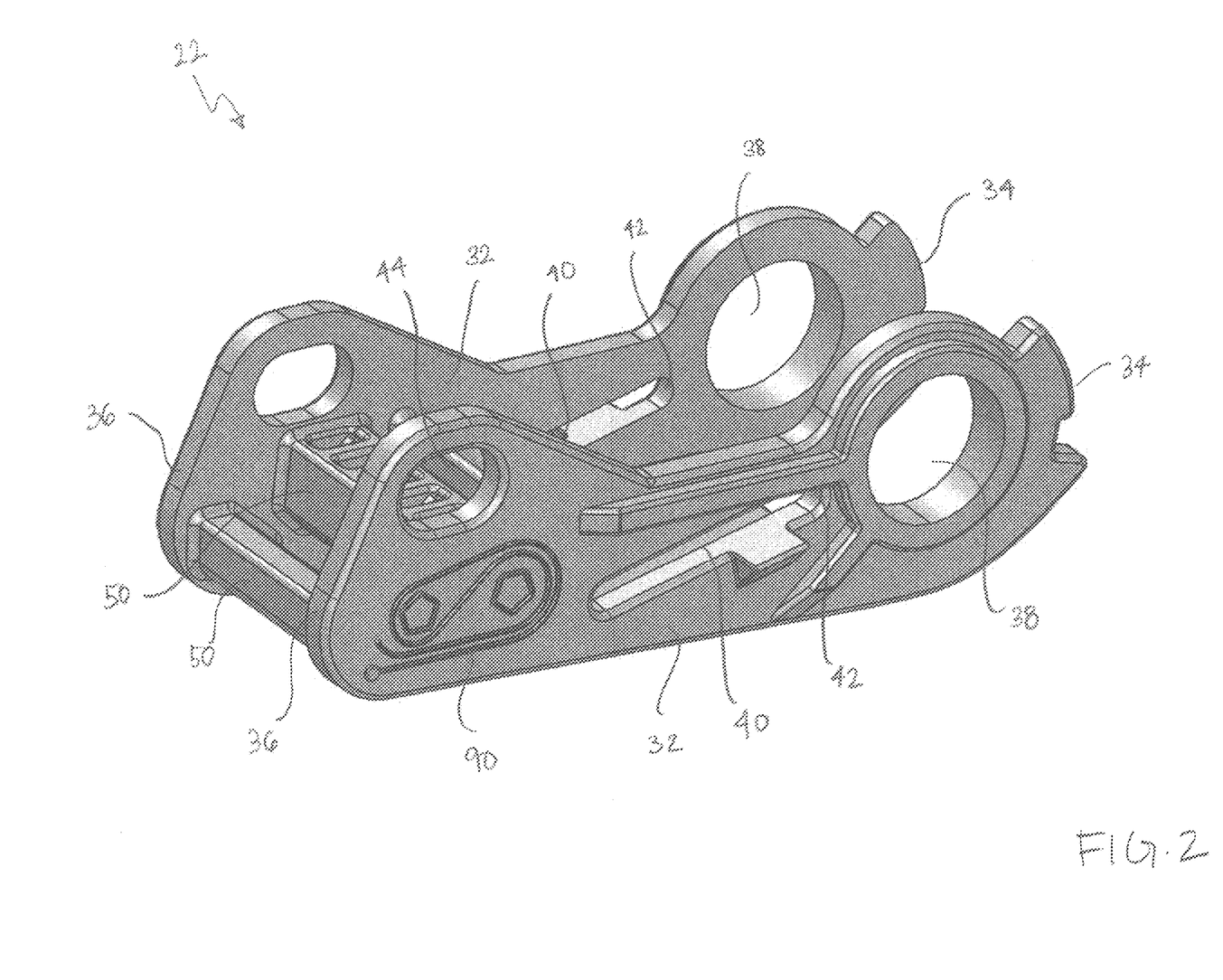
FIG. 2 is a perspective view of a body of a ratchet strap tensioning mechanism according to an embodiment.

An example of a ratchet strap tightening mechanism 20 is illustrated in the figures. As shown, the mechanism 20 includes a body 22, a handle 24, and a barrel 26. With reference now to FIG. 2, the body 22 of the mechanism 20 is illustrated in more detail. In an embodiment, the body 22 is formed from a metal material. However, embodiments where the body 22 is formed from another suitable material, such as a composite or plastic for example, are also within the scope of the disclosure. As best shown, the body 22 has a generally rectangular base 30 and two sidewalls or wings 32 are formed at opposite longitudinal sides of the base 30. A length of the sidewalls 32 may be greater than the base 30. Accordingly, the base 30 may be located generally centrally relative to the sidewalls 32, such that both a first end 34 and the second end 36 of the sidewalls 32 are spaced from the base 30. The sidewalls 32 may be integrally formed with the base 30 as a single piece of material, or alternatively, may be separate components that are permanently affixed to the base 30, such as via a weld for example. The sidewalls 32 may be oriented generally parallel to one another and extend perpendicularly from the base 30 in a first direction. In an embodiment, a first end 34 of each sidewall 32 is enlarged relative to the opposite end 36 of the sidewall 32. However, embodiments where the ends 34, 36 of the sidewalls 32 have a similar height, as shown in the FIGS., and embodiments where the height of the sidewalls 32 is uniform over the length of the sidewalls 32 are also within the scope of the disclosure.

A pivot hole 38 is formed near the first end 34 of each sidewall 32. For example, in the illustrated, non-limiting embodiment, the enlarged first end 34 of the sidewall 32 has a generally circular configuration and the pivot hole 38 is formed at the center of the enlarged portion for example. However, the pivot hole 38 may be formed at any suitable location relative to the sidewall 32. Further, a radial slot 40 may be formed in the sidewalls 32. As shown, a first end 42 of the radial slot 40 may be located near the pivot hole 38, such as along an extended radius of the pivot hole 38. The radial slot 40 is configured to slope downwardly as it extends toward the second end 36, away from the pivot hole 38.

A stop 44 extends vertically from the base 30 of the body 22. As shown, the stop 44 is located at an end 46 of the base 30, closest to the second end 36 of the sidewall 32. Further, the stop 44 may, but need not extend between and contact each of the sidewalls 32. A biasing member 48 is arranged directly adjacent the stop 44. In some embodiments, the biasing member 48 may be integrally formed with the stop 44. In the illustrated, non-limiting embodiment, the biasing member 48 has a V-shape, an inverse V-shape, a U-shape, or an inverse U-shape extending towards the first end 34 of the sidewalls 32. However, it should be understood that a biasing member 48 having any suitable configuration is contemplated herein.

Figure 8:
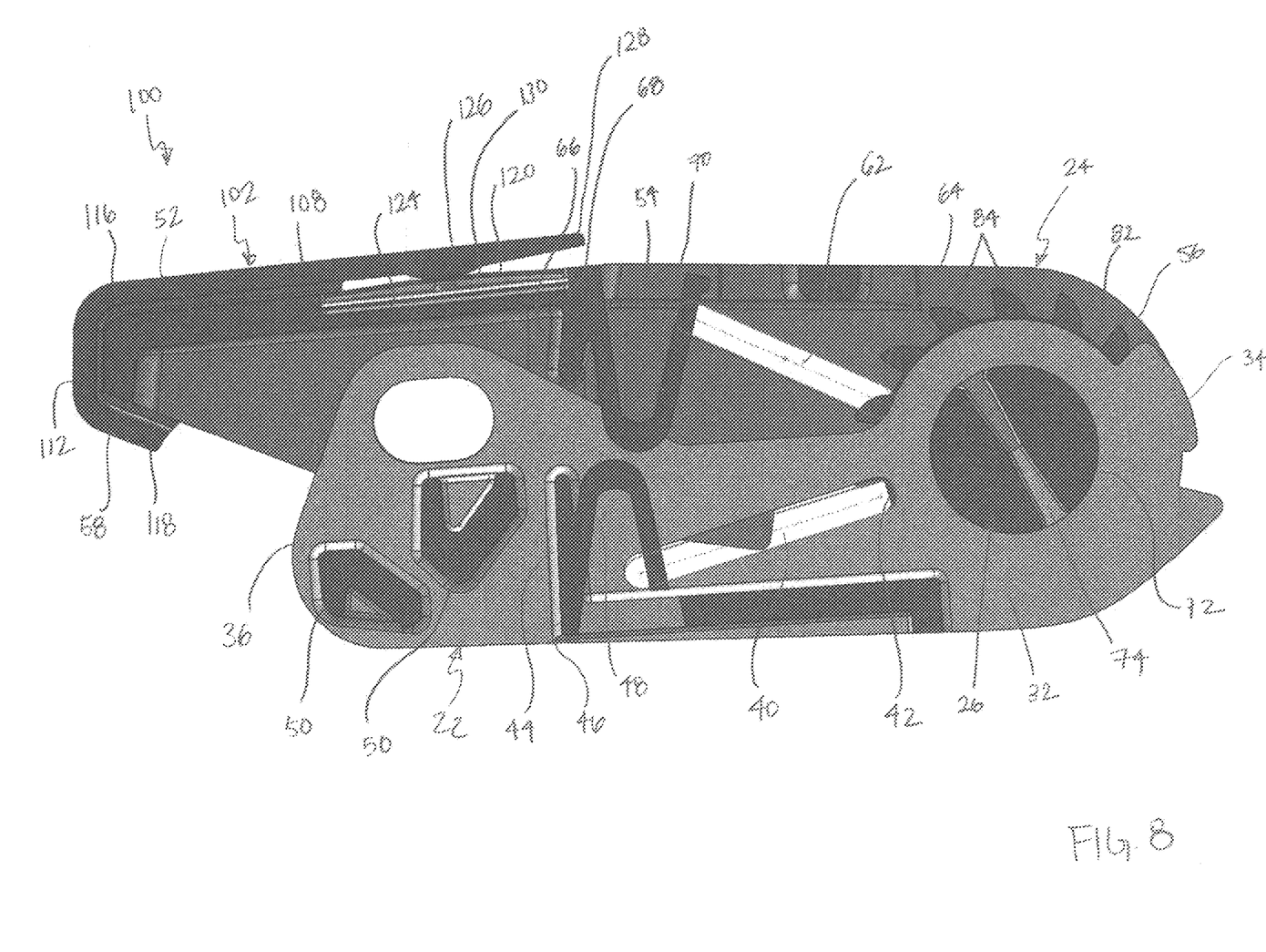
FIG. 8 is a cross-sectional view of a ratchet strap tensioning mechanism including a force indicating device according to an embodiment.

A plurality of strap holders 50 extend between the sidewalls 32 at a position between the stop 44 and the second end 36 of the sidewalls 32. Although two strap holders 50 are illustrated in the figures, it should be understood that any number of strap holders are within the scope of the disclosure. The strap holders 50 may have identical configurations, or different configurations. Further, the strap holders 50 may be vertically aligned or may be vertically offset from one another, as shown in FIG. 8. Further the strap holders 50 may have a generally smooth uniform profile, or alternatively, may have an angular configuration.

Figure 3:
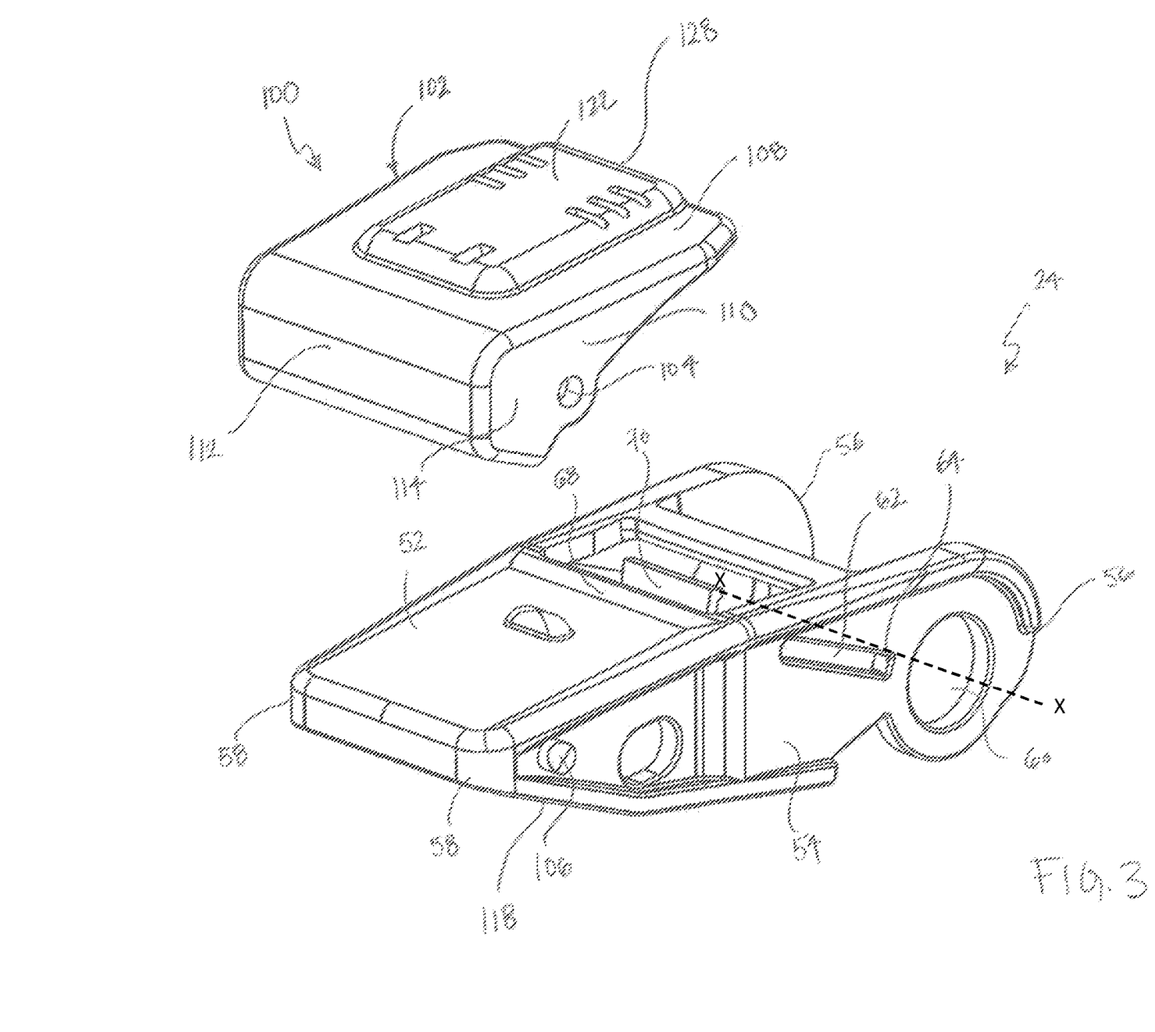
FIG. 3 is a front perspective view of a handle and a force indicating device of a ratchet strap tensioning mechanism according to an embodiment.
Figure 4:
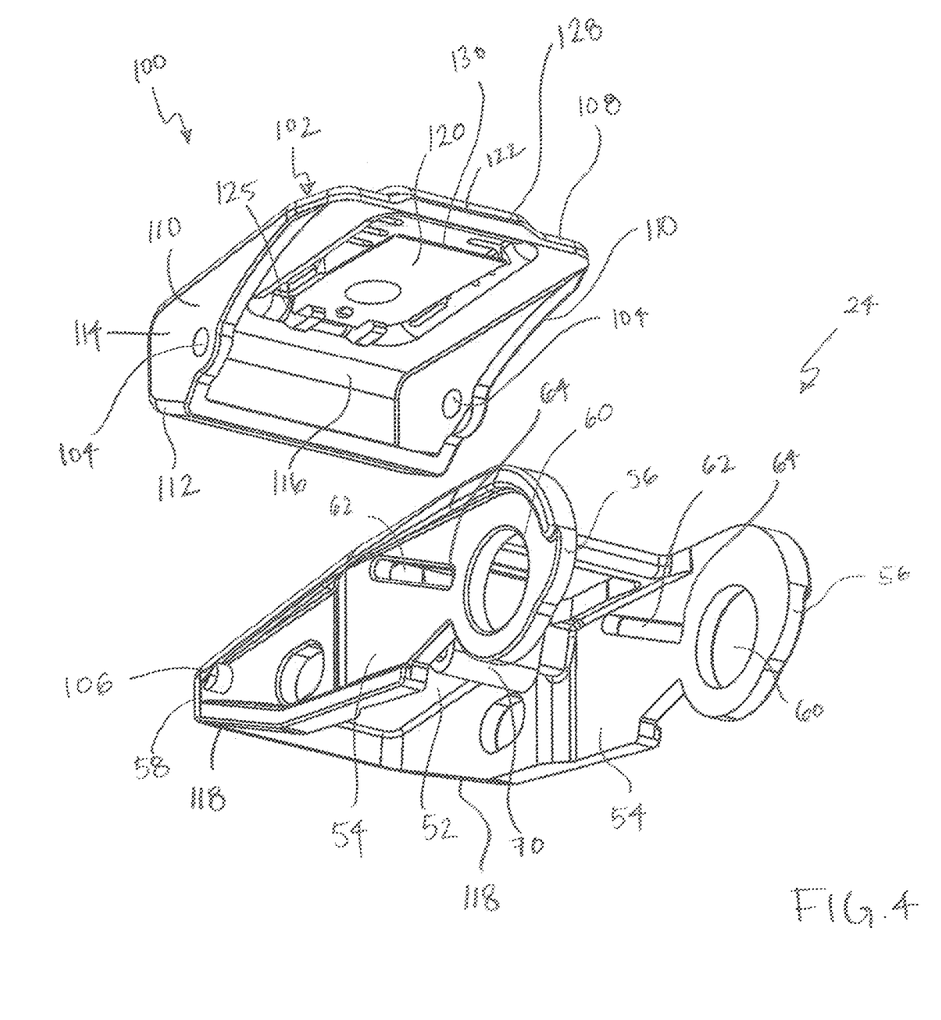
FIG. 4 is a rear perspective view of the handle and force indicating device of FIG. 3 according to an embodiment.

An example of a handle 24 of the mechanism 20 is illustrated in more detail in FIGS. 3 and 4. The handle 24 similarly has a handle base 52 and two sidewalls 54 mounted at opposing longitudinal sides of the handle 24. The opposite sides of the base 52 of the handle 24 correspond with the opposite sides of the base 30 of the body 22. The sidewalls 54 may but need not be integrally formed with the handle base 52, and extend perpendicularly from the base 52, in a second direction. In the illustrated, non-limiting embodiment, the sidewalls 54 of the handle 24 are longer than the sidewalls 32 of the body 22. However, embodiments where the sidewalls 54 of the handle 24 are equal in length or shorter in length than the sidewalls 32 of the body 22 are also contemplated herein.

Further, each sidewall 54 of the handle 24 has an enlarged first end 56 and a second end 58. In an embodiment, the portion of the sidewalls 54 adjacent the second end 58 is connected to the handle base 52 and the first enlarged end 56 is spaced from the handle base 52. As shown, the sidewalls 54 have a non-linear configuration. The first end 56 of each of the sidewalls 54 may be arranged at a slight angle relative to the second end 58. However, embodiments where the sidewalls 54 have another configuration, such as a linear configuration, or a more significant angular configuration are also within the scope of the disclosure. Although the enlarged first end 56 of the sidewalls 54 of the handle 24 have a similar shape to the enlarged first end 34 of the sidewalls 32 of the body 22, embodiments where the shapes are different are also within the scope of the disclosure.

A pivot hole 60 is similarly formed near the first enlarged end 56 of each sidewall 54 of the handle 24. However, the pivot hole 60 may be formed at any suitable location relative to the sidewall 54. Further, a radial slot 62 may be formed in the sidewalls 54, similar to the radial slot 62 of the sidewalls 54 of the body 22. As shown, a first end 64 of the radial slot 62 is located near the pivot hole 60, such as along an extended radius of the pivot hole 60, and the radial slot 62 is configured to slope upwardly as it extends toward the second end 58 of the sidewalls 54, away from the pivot hole 60.

Another stop 66 extends vertically from the base 52 of the handle 24, such as at an end 68 of the base 52 near the radial slot 62. Further, the stop 66 may, but need not extend between and contact each of the sidewalls 54 of the handle 24. A biasing member 70 is arranged directly adjacent the stop 66. In the illustrated, non-limiting embodiment, the biasing member 70 is integrally formed with the stop 66 and extends from the stop 66 towards the radial slot 62. The biasing member 70, such as a stainless steel spring material for example, 70 may be substantially identical to the biasing member 48 of the body 22. However, it should be understood that embodiments where the biasing member 70 of the handle 24 has a different configuration including size and shape, than the biasing member 48 of the body 22 are also contemplated herein.

A barrel 26 is receivable within the pivot holes 38, 60 of the sidewalls 32, 54 of the body 22 and handle 24. In an embodiment, the barrel 26 includes a shaft 72 having a central slot 74 (see FIG. 8) formed therein to define two generally semicircular portions. In an embodiment, a clip, retaining ring, or other suitable component (not shown) may be located adjacent at least one end 78 of the barrel 26 to restrict axial movement of the barrel 26 relative to the pivot holes 38, 60. However, in other embodiments, one of the ends 78 of the barrel 26 includes a flange 80 having a diameter greater than the pivot hole 38, 60. In such embodiments, a clip or retaining ring may be mounted at or near the end of the barrel 26 opposite the flange 80.

In an embodiment, a pair of ratchet gear wheels 82 is mounted to the shaft 72 of the barrel 26, spaced apart from one another. As shown, the ratchet gear wheels 82 may be located adjacent opposite ends 78 of the barrel 26. The ratchet gear wheels 82 are fixedly mounted to the shaft 72, and therefore are configured to rotate with barrel 26 about a barrel axis X. In an embodiment, a geometry of an opening (not shown) formed in each of the ratchet gear wheels 82 is complementary to the semicircular portions of the shaft 72. In such embodiments, the engagement between the ratchet gear wheel 82 and the semicircular portions of the shaft 72 restricts rotation of the ratchet gear wheels 82 relative to the shaft 72. However, any suitable mechanism for rotationally coupling the ratchet gear wheel 82 to the barrel 26 is within the scope of the disclosure. Each ratchet gear wheel 82 is substantially identical and has a plurality of teeth 84 spaced about the periphery of the ratchet gear wheel 82.

The handle 24 is pivotally connected to the body 22 via the barrel 26. In an embodiment, a width of the handle 24 is greater than a width of the body 22. As a result, each of the sidewalls 54 of the handle 24 is arranged adjacent to and offset from an exterior surface of a sidewall 32 of the body 22. The ratchet gear wheels 82 are arranged within this clearance between the pairs of sidewalls 32, 54, respectively. When installed, a portion of the diameter of the ratchet gear wheels overlaps with an adjacent end 42, 64 of the radial slots 40, 62 of both the body 22 and handle 24.

A pawl 86 is arranged within body 22 of the ratchet strap tightening mechanism 20. As shown, the sides of the pawl 86 extend through the radial slots 40 formed in the sidewalls 32 of the body 22. Accordingly, the pawl 86 is configured to translate relative to the body 22 along the path defined by the radial slots 40. The pawl 86 may additionally include a protrusion or stub (not shown) extending towards and configured to engage the biasing member 48. A driver 88 having a similar configuration to the pawl 86 may be mounted within the handle 24. The sides of the driver 88 are received within the radial slots 62 formed in the sidewalls 54 of the handle 24 and a portion of the driver 88 extends towards the biasing member 70.

The ratchet gear wheels 82 are mounted such that as the handle 24 is rotated about the axis X of the barrel 26, the driver 88 engages the teeth 84 of the ratchet gear wheel 82 and cause them to rotate about the axis X. At the same time, the sides of the pawl 86 engage a tooth of each respective ratchet gear wheel 82 to restrict rotation about the axis in a second, opposite direction. More specifically, when the handle 24 is rotated towards the body 22, the biasing member 70 of the handle 24 is compressed by the driver 88, and the biasing member 48 of the body 22 is compressed by the pawl 86. Upon release of the handle 24, the biasing members 48, 70 will cause the driver 88 and the pawl 86 to slide within their respective radial slots 40, 62 causing both the driver 88 and the pawl 86 to engage a tooth of each respect ratchet gear wheel 82. As the handle 24 rotates away from the body 22, the ratchet gear wheels 82 and the barrel 26 rotate in the same direction as the handle 24.

Figure 5:
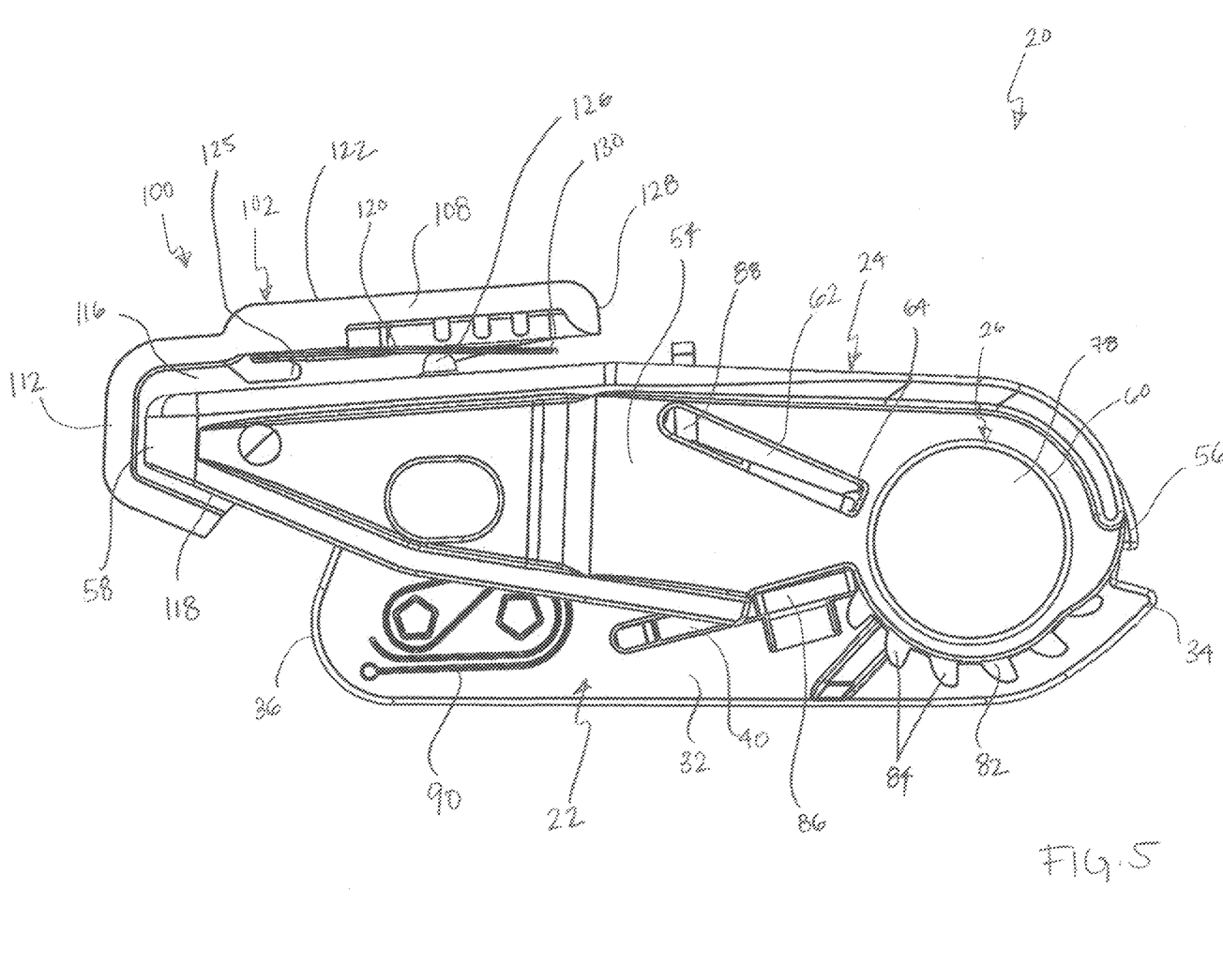
FIG. 5 is a side view of the ratchet strap tensioning mechanism including a force indicating device of FIG. 1 according to an embodiment.

A free end of a strap, illustrated schematically at 90 (see FIGS. 2, 5, and 7), is attached to the one or more strap holders 50 of the body 22. When the mechanism 20 is operated to tighten the strap, the strap is held on the strap holders 50 via friction. Accordingly, a hook or permanent strap loop is not required for operation of the mechanism.

The ratchet strap tightening mechanism 20 may additionally include a force indicating device 100 configured to indicate to an operator when a desired force has been applied to the ratchet handle 24. The force on the handle 24 applies torque to the barrel 72, which correlates to the force applied to the strap connected to the mechanism 20. In an embodiment, the force indicating device 100 is a torque pressure indicator. The force indicating device 100 may be configured to provide an audible indicator, such as a "click" for example, to indicate to an operator that the desired force has been applied. Alternatively, or in addition, the force indicating device 100 may be configured to visually indicate or provide a haptic or tactile feedback to the user to indicate that the desired force has been applied.

In the illustrated, non-limiting embodiment, the force indicating device 100 includes a lever 102 pivotally connected to the handle 24. As shown, the lever 102 may include a coaxial first and second opening 104 configured to receive a corresponding first and second pin 106 formed at the sidewalls 54 of the handle 24, such as at the exterior of the handle 24 for example. The pins 106 may be formed near the second end 58 of the sidewalls 54, such that when the lever 102 is coupled to the handle 24, the lever 102 substantially overlaps the base 52 of the handle 24. However, it should be understood that in other embodiments, the grooves 104 may be formed in the handle 24 and the pins 106 may extend from an interior surface of the lever 102 (see FIGS. 6-8). Further, another type of connection between the lever 102 and the handle 24 that allows the lever 102 to rotate relative to the handle 24 is also contemplated herein.

The lever 102 includes a base 108 having a surface engageable by a user. The base 108 of the lever 102 may be located upwardly adjacent the base 52 of the handle 24. In an embodiment, the lever 102 additionally includes one or more sides 110 that extend generally perpendicularly from the base 108, such as downwardly therefrom adjacent the sidewalls 54 of the handle 24. As shown, the lever 102 additionally includes a front sidewall 112 that extending downwardly from the base 108 and connected to the sidewalls 110. In the illustrated, non-limiting embodiment, the front sidewall 112 is connected to multiple surfaces of the sidewalls 110 adjacent an end 114 of the sidewalls 110. The base 108, sidewalls 110, and front sidewall 112 may be integrally formed with one another as a unitary body or may be separate components affixed to one another. In such embodiments, an interior or cavity 116 is defined between the base 108, sidewalls, 110, and front sidewall 112. When the lever 102 is affixed to the handle 24, the second end 58 of the sidewalls 54 of the handle 24 and the adjacent end of the base 52 of the handle 24 may be arranged within the cavity 116 of the lever 102.

Further, as shown, a portion of the front sidewall 112 of the lever 102 may be positioned generally adjacent a corresponding lower surface 118 of the sidewalls 54 of the handle. As the lever 102 rotates relative to the handle 24, the front sidewall 112 may contact this lower surface 118 to define an area of force, to be described in more detail below. In an embodiment, the connection between the lever 102 and the sidewalls 54 of the handle 24 may be designed to allow the axis of rotation of the lever 102 relative to the handle 24 to be adjusted. For example, the lever and the handle may be connected via pins 106 receivable within an elongated slot 104. Such a configuration would allow the area of force where the front sidewall 112 contacts the sidewalls 54 to be adjusted as well. However, it should be understood that embodiments where only the location of the rotational axis is adjustable, or only the area of force is adjustable are also contemplated herein. Either of these adjustments may be used to vary the force required to operate the indicator of the force indicating device 100.

The force indicating device 100 additionally includes a resilient member 120 configured to cooperate with the lever 102. Although a generally planar sheet-like resilient member 120 is shown in the figures, it should be understood that any suitable member having a bias is within the scope of the disclosure. In an embodiment, shown in FIGS. 1 and 3-5, the resilient member 120 is mounted to the lever 102. For example, the base 108 of the lever 102 may include a raised portion 122 and the resilient member may be positioned directly underneath the raised portion 122. In such embodiments, the resilient member 120 may, but need not have a size and/or similar to the raised portion 122 of the base 108. In another embodiment shown in FIGS. 6-8, the resilient member 120 is mounted to the base 52 of the handle 24. For example, a cavity 124 may be formed in an upper surface of the base 52 and the resilient member 120 may be mounted within the cavity 124.

Figure 6:
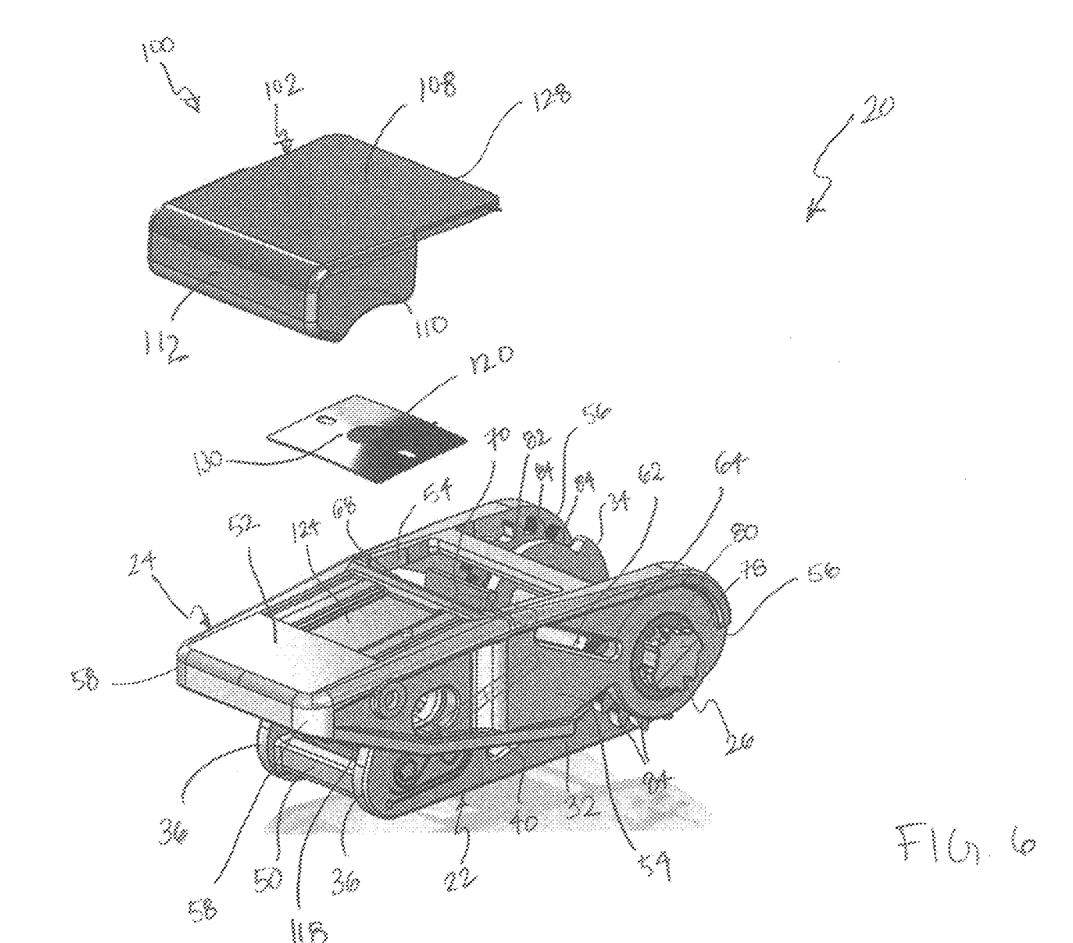
FIG. 6 is a partially exploded front perspective view of a ratchet strap tensioning mechanism according to another embodiment.
Figure 7:
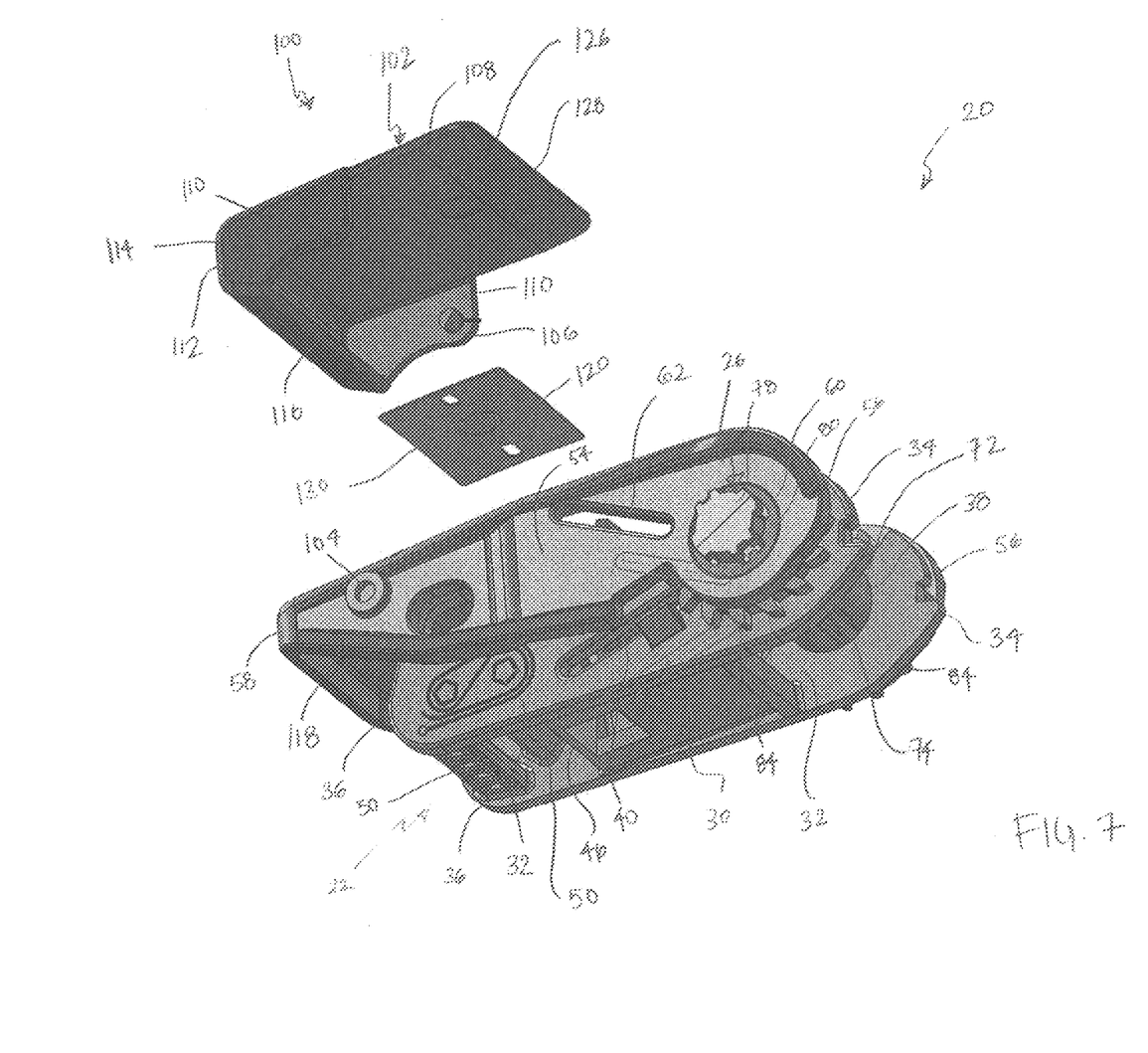
FIG. 7 is a rear perspective view of the ratchet strap tensioning mechanism of FIG. 6 according to an embodiment.

Regardless of whether the resilient member 120 is coupled to the lever 102 or to the handle 24, the resilient member 120 is mounted so that a portion of the resilient member 120 is movable in response to rotation of the lever 102 relative to the handle 24. The resilient member 120 may be mounted via any suitable means, such as one or more fasteners for example. In the illustrated, non-limiting embodiment of FIGS. 3-5, a portion of the resilient member 120, such as an end for example, is clamped between one or more clips 125 and an adjacent surface of the lever 102. In the embodiment of FIGS. 6-8, the resilient member 120 is simply supported by opposite sides thereof.

As the lever 102 rotates relative to the handle 24, a force is applied to the movable portion of the resilient member 120. For example, in embodiments were the resilient member 120 is affixed to the lever 102, a protrusion 126 extends upwardly from the base 52 of the handle 24. Accordingly, as the distal end 128 of the lever 102 rotates towards the handle 24, the protrusion 126 will engage and apply a force to the movable portion 130 of the resilient member 120. In embodiments where the resilient member 120 is mounted to the handle 24, the protrusion 126 may extend downwardly from a surface of the lever 102 facing the handle 24. In such embodiments, as the distal end 128 of the lever 102 rotates towards the handle 24, the protrusion 126 will contact and apply a force to the movable or unsupported portion of the resilient member 120.

The protrusion is configured to engage the resilient member at a point of resistance. The force generated at the point of resistance is a function of the distance between the protrusion and the rotational axis of the lever. The force indicating device 100 is designed such that the force applied to the resilient member 120 by the protrusion 126 is only greater than the biasing force of the resilient member 120 when the force applied to the strap connected to the tightening mechanism 20 is greater than a predetermined threshold. The movement of the resilient member 120 in response to this force functions as an indicator, such as by generating a click or snap, to indicate that the desired force has been reached.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ratchet strap tensioning mechanism comprising:
   a barrel defining an axis of rotation;
   a body and a handle coupled via the barrel, wherein each of the body, the handle and the barrel is independently rotatable about the axis of rotation;
   at least one ratchet gear wheel mounted to the barrel, the at least one ratchet gear wheel being to the barrel at a position between a portion of the body and the handle;
   a driver for rotatably driving the at least one ratchet gear wheel about the axis of rotation;
   a pawl for restricting rotation of the at last one ratchet gear wheel about the axis of rotation; and
   a force indicating device connected to at least one of the body and the handle, the force indicating device including a lever separate from and rotatable relative to the handle, wherein the force indicating device is operable to indicate to a user when a predetermined force is applied to the ratchet strap tensioning mechanism,
   wherein the force indicating device further comprises a resilient member, and
   wherein the resilient member is a click spring.

2. The ratchet strap tensioning mechanism of claim 1, wherein the force indicating device is rotatable relative to the handle about another axis.

3. The ratchet strap tensioning mechanism of claim 1, wherein a position of another axis is movable relative to the handle to adjust the predetermined force.

4. The ratchet strap tensioning mechanism of claim 1, wherein the resilient member is mounted to the lever.

5. The ratchet strap tensioning mechanism of claim 1, wherein the resilient member is mounted to the handle.

6. The ratchet strap tensioning mechanism of claim 1, wherein the lever is operable to contact the handle at an area of force, and a position of the area of force is movable to adjust the predetermined force.

7. The ratchet strap tensioning mechanism of claim 1, wherein at least a portion of the ratchet strap tensioning mechanism is formed form a plastic material.

8. The ratchet strap tensioning mechanism of claim 1, wherein the force indicating device provides a haptic feedback to the user to indicate when the predetermined force is applied to the ratchet strap tensioning mechanism.

9. The ratchet strap tensioning mechanism of claim 1, wherein the force indicating device provides audible feedback to the user to indicate when the predetermined force is applied to the ratchet strap tensioning mechanism.

10. A method of operating a ratchet strap tensioning mechanism comprising:
    rotating a handle about an axis of rotation;
    driving a barrel and one or more ratchet gear wheels affixed to the barrel about the axis of rotation in response to rotating the handle;
    rotating a lever of a force indicating device, the lever of the force indicating device being separate from and rotatable relative to the handle; and
    indicating when a predetermined force is applied to the ratchet strap tensioning mechanism,
    wherein indicating when the predetermined force is applied further comprises opposing a biasing force of a resilient member of the force indicating device, and
    wherein the resilient member is a click spring.

11. The method of claim 10, wherein indicating when the predetermined force is applied to the ratchet strap tensioning mechanism includes generating a haptic feedback.

12. The method of claim 10, wherein indicating when the predetermined force is applied to the ratchet strap tensioning mechanism includes generating an audible or visual feedback.

13. The method of claim 10, further comprising adjusting the predetermined force indicated by the force indicating device.

14. The method of claim 13, wherein adjusting the predetermined force indicated by the force indicating device includes adjusting an axis of rotation of the force indicating device.

15. The method of claim 13, wherein adjusting the predetermined force indicated by the force indicating device includes adjusting a location at which the force indicating device contacts the handle of the ratchet strap tensioning mechanism.

* * * * *